United States Patent
Fabel

(10) Patent No.: US 6,383,593 B1
(45) Date of Patent: May 7, 2002

(54) DELIVERY CONFIRMATION FORM FOR NON-IMPACT PRINTER

(75) Inventor: Warren M. Fabel, Delray Beach, FL (US)

(73) Assignee: Laser Substrates, INC, Boca Raton, FL (US)

(*) Notice: Subject to any disclaimer, the term of this patent is extended or adjusted under 35 U.S.C. 154(b) by 0 days.

(21) Appl. No.: 09/401,424
(22) Filed: Sep. 22, 1999
(51) Int. Cl.[7] ................................................. B32B 7/14
(52) U.S. Cl. ...................... 428/42.3; 283/81; 428/40.1; 428/41.8; 428/42.1; 428/42.2; 428/43; 428/192; 428/194; 428/201; 428/202
(58) Field of Search ............................... 428/40.1, 41.8, 428/42.1, 42.2, 42.3, 43, 192, 194, 201, 202; 283/81

(56) References Cited

U.S. PATENT DOCUMENTS 6,213,518 B1 * 4/2001 Raming ....................... 283/67

\* cited by examiner

Primary Examiner—Nasser Ahmad
(74) Attorney, Agent, or Firm—Ted W. Whitlock

(57) ABSTRACT

A multi-part form useful as a delivery confirmation form is described. The form has two plies releasably adhered together by having adhesive and adhesive-release material disposed on opposing faces of the plies. Separable sections of the form are formed by a perforation line made along the length of the form. A gap in adhesive release material along the perforation line in the bottom ply of the form is provided to form a substantially permanent bond between the plies.

12 Claims, 5 Drawing Sheets

DELIVERY CONFIRMATION FORM FOR NON-IMPACT PRINTER

BACKGROUND OF THE INVENTION

1. Field of the Invention

This invention relates to a multi-part label sheet for use with a non-impact printer, and more particularly, to a multi-part label sheet for producing delivery confirmation labels which may be used for United States Postal Service mailings.

2. Background Information

Confirming delivery of a mail piece without requiring a return receipt has been historically offered only by private delivery services. The United States Postal Service (USPS) has now taken steps to provide this service to its customers. However, it is desirable to provide these services using forms which conform to the most currently available technologies, namely, the personal computer. The personal computer has revolutionized the postal industry by providing individuals or companies with a versatility of options, including the capability to purchase postage "on-line", i.e., over the Internet. Providing delivery confirmation for USPS customers using personal computers is a further advancement of the services available from the USPS.

Most personal computers in use today employ non-impact printing devices such as laser printers. Accordingly, it is necessary to offer printable forms which are compatible with non-impact printers. One feature that can be important and advantageous for printing using a non-impact printer is the capability to print all necessary information on a single face of a sheet or form by a single pass through the non-impact printer.

Multi-part forms, i.e., forms which have multiple sections on a single sheet forming a plurality of labels, can pose particular problems in that certain of these sections may pull away or separate from the sheet or from another of the sections. When this occurs, the remaining sections can be rendered unusable, therefore increasing the amount of waste. For example, a multi-part form comprising two or more lamina, or plies, held together by an adhesive and an adhesive-release material disposed between two contacting plies, and having a perforation between its separable sections, can result in one section separating from another. This can be especially problematic when the perforation parallels a weaker perforation or pressure sensitive cut because the weaker cut will tend to separate before the stronger perforation. Thus, the sections divided by the weaker cut separate before they are intended to be separated.

Typically, such two-ply forms comprise a bottom, or backing, ply having an adhesive-release material disposed substantially over its entire inner face, the inner face being defined as the face contacting an opposing face of an overlying upper or top ply. The upper ply typically has adhesive material disposed on its inner face which opposes and contacts the inner face of the backing ply. The releasable contact between surfaces disposed with a coating of adhesive and surfaces coated with adhesive-release material allow for removing sections, e.g., labels, formed in one of these plies.

Pressure sensitive lines, also known as die-cuts, of various desired shapes and sizes can be made in one of the plies, usually the top ply, so that these areas form sections which serve as removable labels of that desired shape and size. Removing the label section of the upper ply exposes adhesive coated on the inner face of the upper ply. The adhesive-coated face can then be used to affix the removed section to a mail piece, to another form, or to a record sheet.

In addition, multi-part forms often have perforation lines formed through both plies so that entire portions of the sheet can be removed from one another when only certain of the label sections are printed during a particular use. For example, when a user of the label form prints fewer than the total number of labels provided on a sheet, the unused label can be completely separated from the printed labels by tearing the sheet along the perforation line. Thus, the unused labels can be printed and used at a later time. However, these perforations are generally stronger than pressure sensitive cuts. Accordingly, when perforation lines are formed in close proximity to pressure sensitive cuts, the weaker pressure sensitive cuts can separate first, causing the upper ply to shift or tear and create an uneven guide edge on the form. This undesirable result is exacerbated when adhesive release material is present on the surface underlying the pressure sensitive cut. If the upper ply shifts or tears along the line of separation, the unused label can be ruined or can cause a jam in the printer or the sheet feeder mechanism. Thus, it would be advantageous to provide a form or label sheet which can alleviate this problem of ply separation.

SUMMARY OF THE INVENTION

In accordance with one aspect of the invention, there is provided a multi-part, multi-ply form or label sheet which is advantageously adapted for use with a non-impact printer and can effectively alleviate the problem of shifting or tearing of the unused label section when separating the sections along a perforation line. This label sheet according to the subject invention can be advantageously used for forms which are printed on one side of the form by using a non-impact printer proximate to the time the form is to be used. Preferably, the subject label sheet is adapted for use as a delivery confirmation form that can be printed on a personal computer using a non-impact printer.

The preferred embodiment of the subject label sheet includes a first ply having an outer face on which certain information, e.g., delivery confirmation information, can be printed, and a second ply forming a backing. Preferably, the label sheet can be used to print information on one and the same face of the sheet, allowing for printing by a non-impact printer in communication with a computer having a database which holds information that can be directed to be printed on the form. The subject label sheet comprises a plurality of sections formed by die-cuts or pressure sensitive cuts made in the upper ply wherein the pressure sensitive lines form removable label areas and a bordering matrix area. Pressure sensitive lines of desired shape and size are preferably made through the upper ply but not the backing ply to facilitate removal of the labels. The sheet can further be divided by perforations which can facilitate separation of those label sections from one another. These perforations are preferably made through both the upper and backing plies.

Preferably, the form includes a means for removably affixing the first ply to the second, or backing, ply. More preferably, this removable affixing means comprises a layer of adhesive-release material selectively or patternly disposed or coated on an inner face of the backing ply and an adhesive layer patternly disposed or fully coated on the inner face of the upper ply such that the adhesive is retained on any portion of the upper ply removed from the backing ply. Most preferably, the adhesive-release material can be selectively disposed in a particular pattern such that the adhesive-release material is absent, forming a linear gap in the adhesive-release coating, along the perforation line. This linear gap in the coating of adhesive-release material permits the adhesive disposed on the inner face of the upper ply to come into direct contact with the backing ply material such that the adhesive can form a substantially permanent bond therebetween. The bond formed between the adhesive and the backing ply can advantageously prevent the matrix bordering the perforation line from prematurely separating along the pressure sensitive cut line, thereby shifting or tearing when the form sections are separated along the perforation.

The lower ply of the label sheet according to a further embodiment of the subject invention can also have an adhesive-release-free area around the entire perimeter of the lower ply so that the edges of the plies remain bonded and do not tend to separate or pull apart when fed through a non-impact printer. A further embodiment can have a linear gap or adhesive-free area around the perimetrical edge of the upper ply to prevent adhesive from bleeding or oozing outside the edges of the sheet.

BRIEF DESCRIPTION OF THE DRAWINGS

Preferred embodiments of the subject invention are hereafter described with specific reference being made to the following Figures, in which:

FIG. 4B shows an additional adhesive-release free area around the perimetrical edge of the backing ply

DETAILED DESCRIPTION OF THE INVENTION

Figure 1:
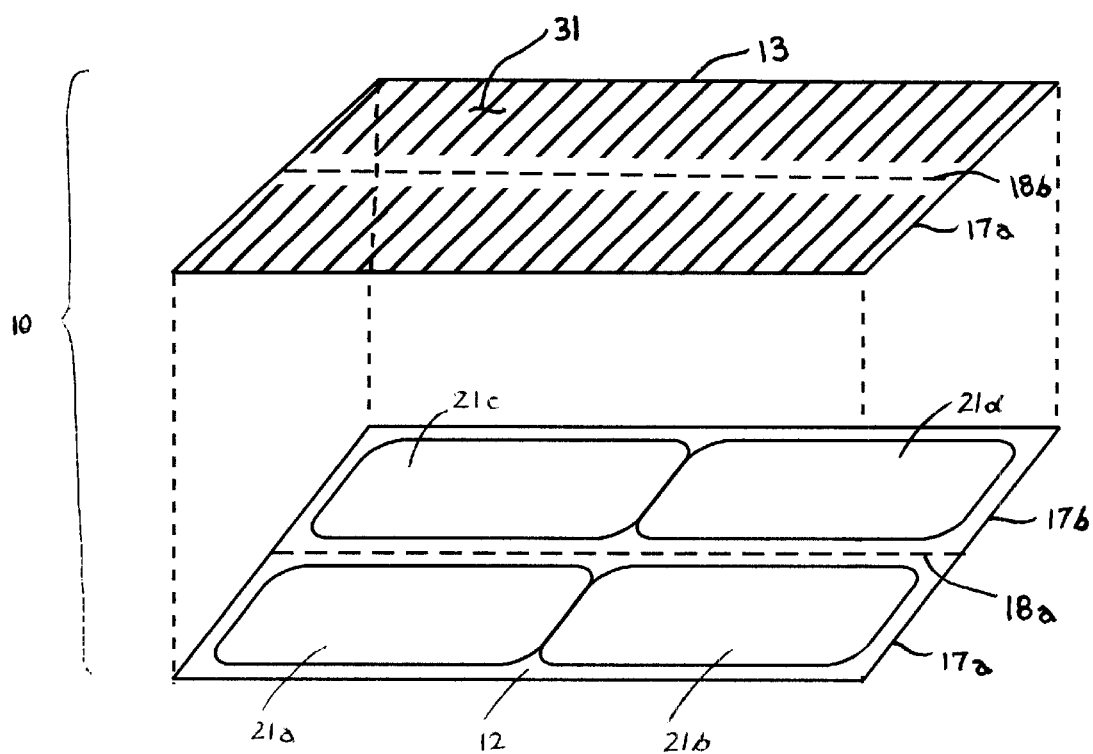
FIG. 1 shows an exploded perspective view of a form according to the subject invention illustrating a two-ply embodiment having pressure sensitive label portions formed in a first or upper ply, a second ply serving as a backing ply and perforation lines formed in each ply to provide separable label sections.

Referring to the accompanying Figures, a two-ply form sheet 10 is shown as a preferred embodiment of the subject invention. As shown in FIG. 1, the label sheet 10 has two plies, 12 and 13, superimposed and affixed together by a pressure sensitive adhesive disposed or coated on an inner surface of the upper ply 12 (adhesive coating illustrated in FIG. 3).

Figure 2:
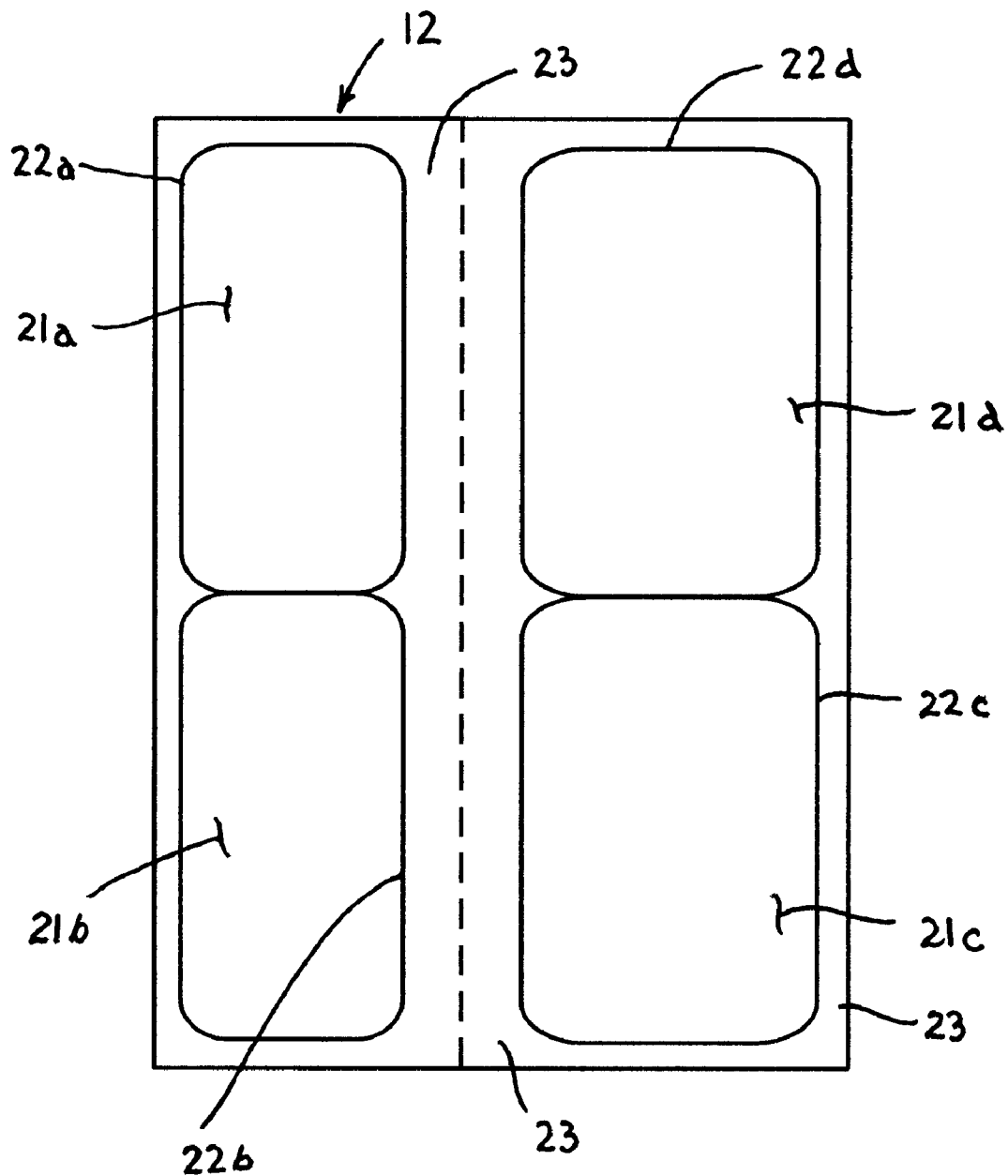
FIG. 2 illustrates a plan view of the front face of the two-ply form of the subject invention illustrating the "4-up" embodiment according to FIG. 1 wherein the label sheet provides four removable labels per sheet.

FIG. 2 shows the outward-facing surface of upper ply 12 of the subject label sheet 10 having four label portions 21a, 21b, 21c, and 21d formed therein by pressure sensitive lines 22a, 22b, 22c, and 22d. In a preferred embodiment utilizing standard 8½ inch by 11 inch sheets, the labels 21a–21d formed therein can be four inches by five inches in dimension. These label dimensions can be preferably used for printing delivery confirmation labels on a non-impact printer using a personal computer. The area remaining outside or bordering the labels on the upper ply is termed the "matrix" area 23. Other sizes and dimensions of labels can also be formed by the pressure sensitive lines and are contemplated for this invention. Referring back to FIG. 1, the upper and lower plies 12 and 13 can further be divided into separable portions 17a and 17b containing two labels each by perforation lines 18a and 18b, respectively.

Figure 3:
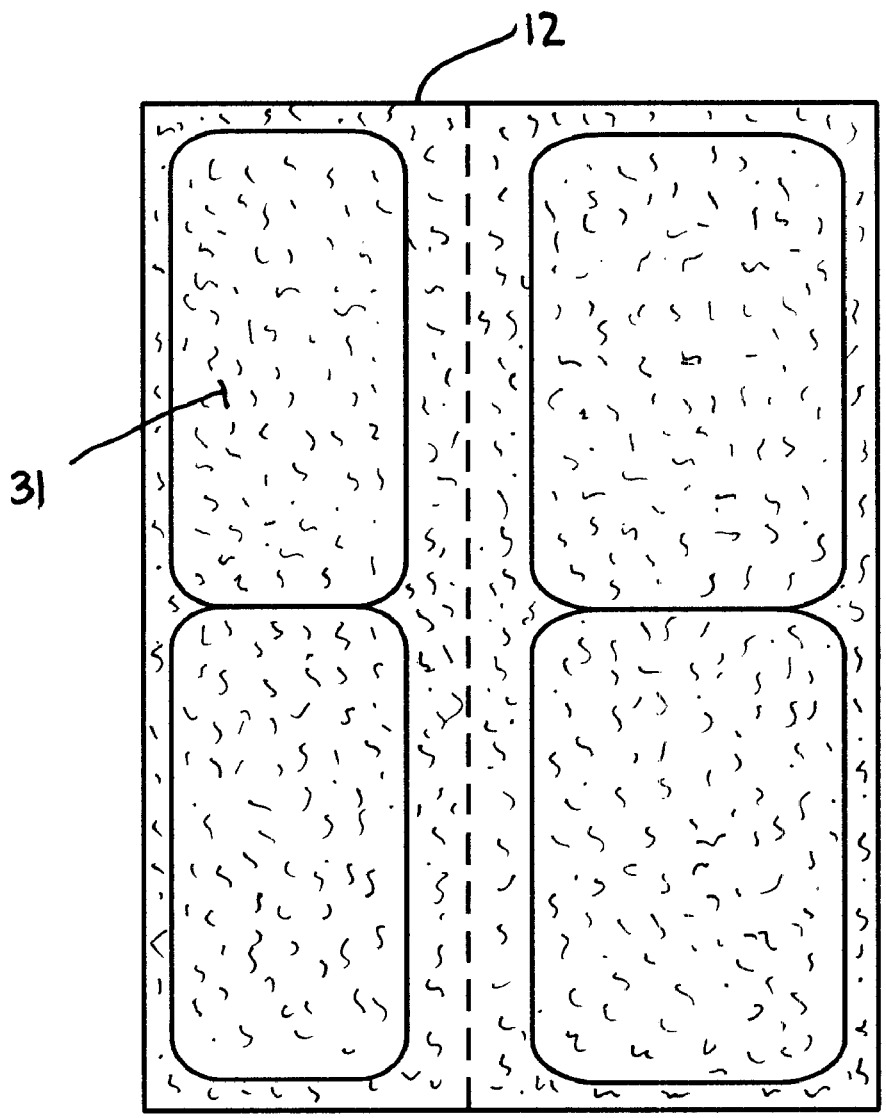
FIG. 3 shows a back or inner face of the upper ply illustrating the area covered by adhesive material.

As illustrated in FIG. 3, upper ply 12 can be coated with an adhesive material 31 over substantially its entire inner surface. A variety of adhesive materials which can be used in the subject invention are well known in the art and are commercially available. Preferably, the adhesive material 31 should have a good affinity to both plies 12 and 13, as well as having the ability to affix any of the label sections 4a–4d to a package, another form, or a record sheet, which typically are a paper or cardboard material. One commercially available adhesive which has been found to be acceptable is a compounded synthetic polymer, such as Craigcoat 1051G, manufactured by Craig Adhesives and Coatings Company, of Newark, N.J.

Figure 4B:
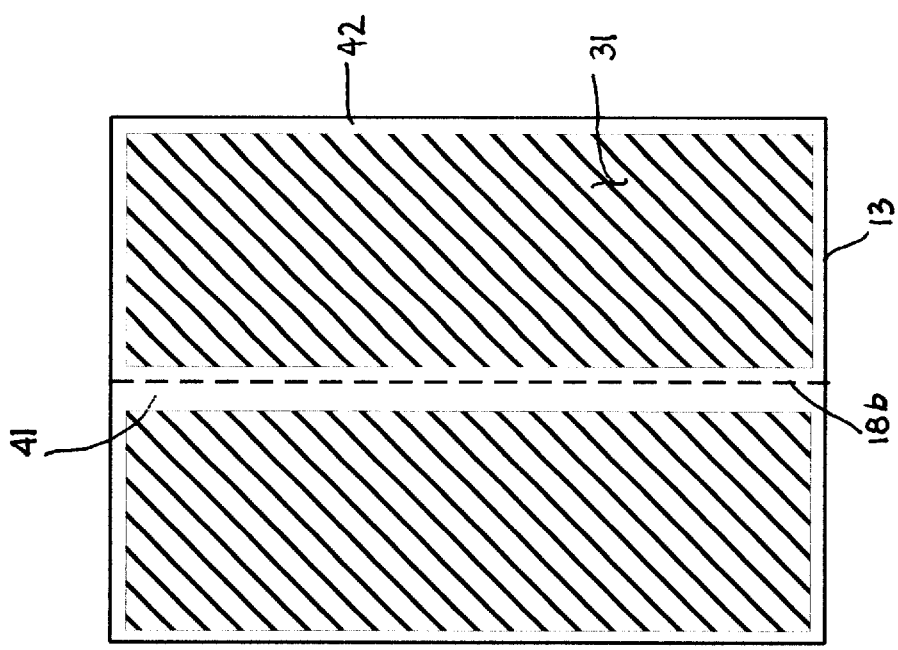
FIGS. 4A and 4B each show an inner face of the backing ply illustrating adhesive-release material disposed on the face in a pattern such that a linear gap of adhesive-release is formed along the perforation line.
Figure 4A:
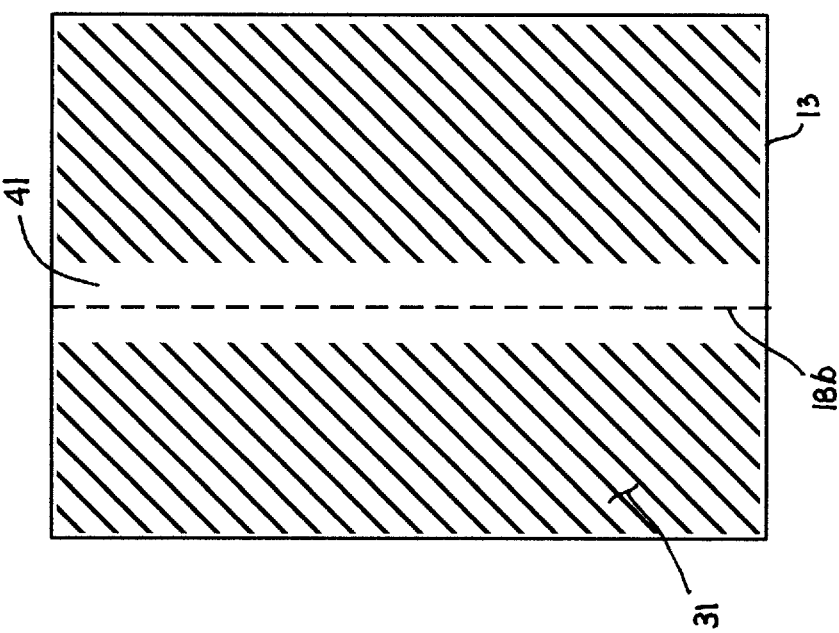

As shown in FIG. 1 and further illustrated in FIGS. 4A and 4B, a coating of adhesive-release material 31, e.g., silicone, is preferably disposed on substantially the entire interior surface of bottom ply 13, except that an adhesive-release-free area forming a linear gap is provided in alignment with perforation lines 18a and 18b. In an alternative embodiment illustrated in FIG. 4B, an adhesive-release-free linear gap 41 is provided in alignment with these perforation lines 18a and 18b, and an additional adhesive-release-free area or gap 42 around the perimetrical edges of the lower ply 13. Preferably, each of these linear gap areas are approximately 1/16 inch to ¼ inch in width.

A variety of adhesive release materials for use with the subject invention are commercially available and are known to those of ordinary skill in the art. Any adhesive-release material which is compatible for use with the other materials used in the subject invention can be employed. For example, silicones manufactured by the GE Silicones division of General Electric Company, USA, can be used to provide compatible release materials. More specifically, the use of UV9400 solventless UV release polymer, in combination with UV9380C or UV9310C photocatalysts, can be photocured in air, upon irradiation with UV radiation of less than 300 nm wavelength, to provide a silicone adhesive-release material having a tightly cross-linked epoxysilicone network. GE Silicones 1178-116 Viscosity Modifier can be used to help in forming precise patterns or discrete areas of the adhesive-release coating.

Figure 5:
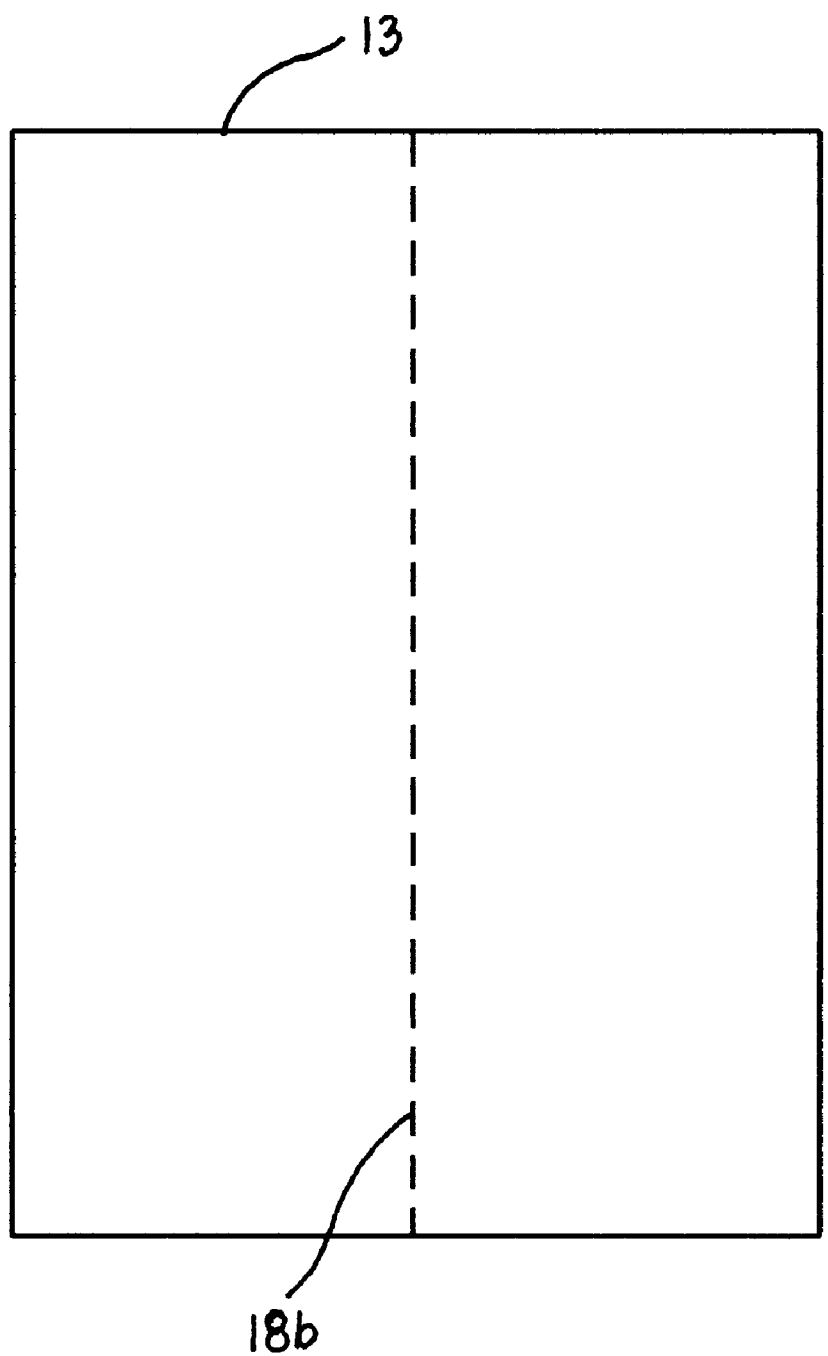
FIG. 5 shows a back face of the backing ply illustrating the perforation line formed therein.

FIG. 5 shows a back face of the lower ply 13, illustrating that perforation line 18b is formed through the lower ply 13, but that the pressure sensitive lines (22a–22d in FIGS. 1–3) formed in the upper ply 2 are not formed in the lower ply 13. The back surface of lower ply 13 can receive preprinted information such as instructions for use of the form. To manufacture the label sheet of the subject invention, the upper and lower plies are coated, in the preferred patterns described, with adhesive and adhesive-release material, respectively. The coated plies are then superimposed with one another and affixed together so that a single sheet comprising the two plies bonded together is formed. Perforations and pressure sensitive lines can then be formed as desired using machinery which is standard in the industry. In addition, if desired, the outer surfaces of the sheets can be printed with borders, instructions for use, color patterns or other decorations or descriptions.

The material for use as the upper and lower plies is preferably a standard material used for manufactured label and backing sheets. Typically, such material is paper or a polymer, but it is preferred that the upper ply material is highly compatible with accepting print from a non-impact printer such as laser or thermal printer. Preferably, the paper used for the subject invention is a commercially available paper product, for example, a standard white background paper or polyester of appropriate thickness or weight.

After the label sheet 10 is manufactured, as described above, it is a flat sheet of conventional standard size, such as 8½"×11" or A4, and is ready for use by a user. The user generated information to be printed includes addressee information and any other information desired by the user, such as return address, customer numbers or codes, shipping or delivery information or instructions, billing or fee information, delivery confirmation number, and the like. The user generated information should be printed on the outward facing surface of upper ply 12.

While the subject invention has been described with reference to the preferred embodiments, many variations are possible within the scope and spirit of the invention. For example, any number of labels may be designed by either adding additional sections to those shown and described or by forming additional pressure sensitive lines or perforations in the label sheet 10. In addition, it would be readily understood that the label sheets according to the subject invention could be manufactured as a roll of continuous sheets or forms for use with a continuous-feed printer. The continuous-feed label sheets can be provided as a roll comprising a plurality of individual sheets, as described, wherein each sheet is separable from one another by a perforation formed between each sheet to provide a tear line.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A multi-part form consisting essentially of
   a single sheet having a first and second ply,
   a perforation formed through the first and second plies along a central, longitudinal axis of the form, said perforation providing two distinct sections to the form and facilitating separation of the two sections of the form by a user,
   a plurality of removable labels formed in each of said sections of the form by die-cuts in the first ply,
   adhesive material disposed between the first and second plies, including adhesive disposed co-linear to the perforation for substantially permanently bonding the plies, and
   adhesive-release material patternly disposed between the adhesive and the second ply to facilitate removal of the labels from the second ply.

2. A multi-part, multi-ply, single-sheet form, printable on a non-impact printer by a single pass through said printer, said form consisting essentially of:
   a first ply having an outer facing surface and an inner facing surface;
   a second ply having an outer facing surface and an inner facing surface;
   said first and second plies superimposed onto one another to form the multi-ply form;
   at least one linear perforation formed through both plies along at least one entire linear dimension of the plies to form a multi-part form separable along said perforation;
   at least two removable labels and a bordering matrix formed on each side of said perforation by pressure sensitive cuts made in the first ply;
   said outer facing surface of said first ply capable of receiving printed information and said inner facing surface having disposed thereon an adhesive material on substantially the entire inner surface thereof;
   said inner facing surface of said second ply having disposed thereon an adhesive-release material for releasably adhering the label sections, and an adhesive-release free area extending each direction from and along said at least one perforation so that the adhesive disposed on the inner surface of the first ply contacts and substantially permanently bonds to the second ply along the perforation.

3. The form of claim 1 wherein the first ply is a laser-printable label material.

4. The form of claim 1 wherein the second ply is a label backing or carrier material capable of receiving adhesive-release material on at least one surface.

5. The form of claim 2 wherein the bordering matrix along said perforation extends about ⅛ inch in each direction away from said perforation.

6. The form of claim 2 wherein the adhesive-release free area of said second ply corresponds to the matrix bordering the perforation.

7. The form of claim 1 wherein said form is manufactured on a standard size sheet.

8. The form of claim 7 wherein the sheet is 8½ inches by 11 inches in dimension.

9. The form of claim 7 wherein the sheet is A4 size.

10. The form of claim 7 wherein the pressure sensitive cuts in the first ply form four identical 4½ inch by 5 inch labels.

11. The form of claim 1 wherein the labels are printable as postal delivery confirmation labels.

12. The form of claim 1 wherein each inner surface of said plies has an adhesive free or adhesive-release free border around its perimetrical edge to prevent the adhesive or adhesive-release material from oozing outside the edge of the form.

* * * * *